(12) United States Patent
Whalen (10) Patent No.: US 6,481,799 B1
(45) Date of Patent: Nov. 19, 2002

(54) VEHICLE SENSITIVE INERTIA LOCKOUT

(75) Inventor: John F. Whalen, Macomb, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 135 days.

(21) Appl. No.: 09/596,289

(22) Filed: Jun. 15, 2000

(51) Int. Cl.$^7$ ............................................... B60N 2/02
(52) U.S. Cl. ................................................. 297/378.11
(58) Field of Search ...................... 297/378.11, 378.12, 297/378.14, 353, 216.13, 216.14, 216.1, 411.32

(56) References Cited

U.S. PATENT DOCUMENTS

| | | | |
|---|---|---|---|
| 4,010,979 A | | 3/1977 | Fisher, III et al. |
| 4,219,234 A | | 8/1980 | Bell |
| 4,579,387 A | | 4/1986 | Bell |
| 4,634,182 A | * | 1/1987 | Tanaka ................... 297/378.11 |
| 4,720,145 A | | 1/1988 | Bell |
| 4,733,912 A | | 3/1988 | Secord |
| 5,211,445 A | * | 5/1993 | Husted et al. .......... 297/378.12 |
| 5,248,184 A | * | 9/1993 | Morris ................... 297/378.11 |
| 5,265,937 A | * | 11/1993 | Allen ..................... 297/378.11 |
| 5,425,568 A | * | 6/1995 | Sliney et al. ......... 297/411.32 X |
| 5,460,429 A | * | 10/1995 | Whalen ............. 297/378.12 X |
| 5,476,307 A | | 12/1995 | Whalen |
| 6,033,022 A | * | 3/2000 | Bauer et al. ........... 297/378.12 |

\* cited by examiner

*Primary Examiner*—Peter M. Cuomo
*Assistant Examiner*—Stephen Vu
(74) *Attorney, Agent, or Firm*—Harness, Dickey & Pierce, P.L.C.

(57) ABSTRACT

An inertia-sensitive hinge mechanism for a seat assembly allows rotation of a first hinge member relative to a second hinge member about a pivot during normal use and prevents rotation about the pivot when a predetermined deceleration force is present. The inertia-sensitive lockout assembly includes a guide assembly coupled to the first and second hinge members and having a tab fixed for movement with one of the first and second hinge members. The guide assembly also includes a follower movable between a detent position and a cam position. The inertia-sensitive lockout assembly also includes an inertial actuator having a center of gravity spaced from its center of rotation wherein, when the first hinge member is in its first position and the predetermined deceleration force is present, the inertial actuator rotates to operatively engage the follower and prevent the follower from moving from its detent position to its cam position.

22 Claims, 6 Drawing Sheets

VEHICLE SENSITIVE INERTIA LOCKOUT

BACKGROUND OF THE INVENTION

1. Technical Field

This invention relates generally to a hinge for folding seats or arm rests of the type used in passenger vehicles and, more particularly, to a hinge mechanism having an inertia-sensitive latch assembly that permits the seat or arm rest to be deployed during normal use but prevents deployment when the vehicle is subjected to deceleration forces exceeding a predetermined threshold level.

2. Discussion

The recent increase in popularity of pick-up trucks, minivans, and sport utility vehicles have led to certain advancements in the use of space for these vehicles. Particularly, there has been an interest in developing seat assemblies that provide increased cargo areas and improved accessibility to storage space. Consistent with this focus, seats that are movable between a stowed position and a deployed position have been developed for use with pick-up trucks, minivans, and sport utility vehicles. Passenger vehicles also commonly include armrests or center consoles located between adjacent seats that are similarly movable between stowed and deployed modes during normal operation.

Typically, the seat or armrest includes hinge supports on one or both opposed sides thereof for pivotal movement between the stowed and deployed positions. The hinges include upper and lower hinge members where the upper hinge member commonly rotates with respect to the lower hinge member about a pivot. The lower hinge member is commonly connected to the frame structure of the seat or vehicle floor depending upon the particular application.

While the above identified hinge assemblies effectively use space and enhance comfort, these assemblies can unexpectedly move from the stowed position toward the deployed position during a sudden vehicular deceleration caused, for example, by a frontal collision or heavy braking of the motor vehicle. Additionally, unexpected movement from the stowed position toward the deployed position can occur more frequently as the hinges wear and become loose. Therefore, a hinge for use in folding passenger seats and armrests that addresses the above deficiencies by inhibiting unexpected movement is desirable.

Although inertia-sensitive hinge mechanisms incorporating some of the above-noted features are commercially available and perform satisfactorily for this intended purpose, a need exists to provide continuous improvement in this field of technology for reducing system complexity and costs while also enhancing operational reliability and durability.

SUMMARY OF THE INVENTION

Accordingly, the present invention is directed to providing an improved hinge mechanism of the type having an inertia-sensitive lockout assembly. The inertia-sensitive hinge mechanism allows rotation of a first hinge member relative to a second hinge member about a pivot during normal use and prevents rotation about the pivot when a predetermined deceleration force is present. The inertia-sensitive lockout assembly includes a guide assembly coupled to the first and second hinge members. The guide assembly includes a tab fixed for movement with one of the first and second hinge members and a follower coupled to the other of the first and second hinge members for movement between a detent position and a cam position. The follower engages the tab for movement between a first position wherein the follower operatively engages a first tab detent and a second position wherein the follower operatively engages a second tab detent. The follower is in its detent position when the follower is in the first or second positions and its cam position when engaging a cam surface of the tab that extends between the first and second tab detents. The inertia-sensitive lockout assembly also includes an inertial actuator operatively connected to and rotatable with respect to the other of the first and second hinge members between a blocking position and a retracted position. The inertial actuator has a center of gravity spaced from its center of rotation wherein, when the follower is in its first position and the predetermined deceleration force is present, the deceleration force places the inertial actuator in its blocking position such that a blocking surface on the actuator blocks the follower from moving from its first position.

In another feature of the present invention, the center of gravity of the inertial actuator is located above and horizontally rearward of its center of rotation.

In yet another feature of the invention, the guide assembly guides rotation of the first hinge member with respect to the second hinge member and includes a pin upon which the follower is disposed for axial movement therealong between its cam and detent positions.

In still another feature of the invention, the inertia-sensitive lockout assembly includes actuator stop means and a spring that urges the inertial actuator against the stops when the actuator is in its blocking and retracted positions to prevent vibration of the inertial actuator.

In a further feature of the present invention, the inertia lockout assembly is part of an inertia-sensitive hinge mechanism intercoupling a first hinge adapted to be connected to a seatback and seat bottom and a second hinge member adapted to be coupled to a vehicle.

Additional benefits and advantages of the present invention will become apparent to those skilled in the art after studying the following specification and appended claims taken in conjunction with the accompanying drawings.

BRIEF DESCRIPTION OF THE DRAWINGS

The present invention will become more fully understood from the detailed description given below and the accompanying drawings in which.

DESCRIPTION OF THE PREFERRED EMBODIMENT

It should be understood from the outset that the present invention will be described in connection with a stowable passenger seat such as are used in extended cab pick-up trucks and the like so as to illustrate the best mode of practicing the invention at the time this application was filed. It is contemplated, however, that the inertia-sensitive hinge mechanism of the present invention may also be readily adapted for use in arm-rest hinge applications, center consoles such as are used in split bench seats, or additional seat hinge applications commonly used for reclining a seatback relative to a seat bottom in standard passenger seats. Other modifications will become apparent to those skilled in the art after having the benefit of studying the text, drawings and claims that follow this detailed specification. It should also be appreciated that the illustrated hinge mechanism is intended to be positioned on a left-side of the seat assembly with the right-hand side mechanism being a mirror image thereof.

Figure 1:
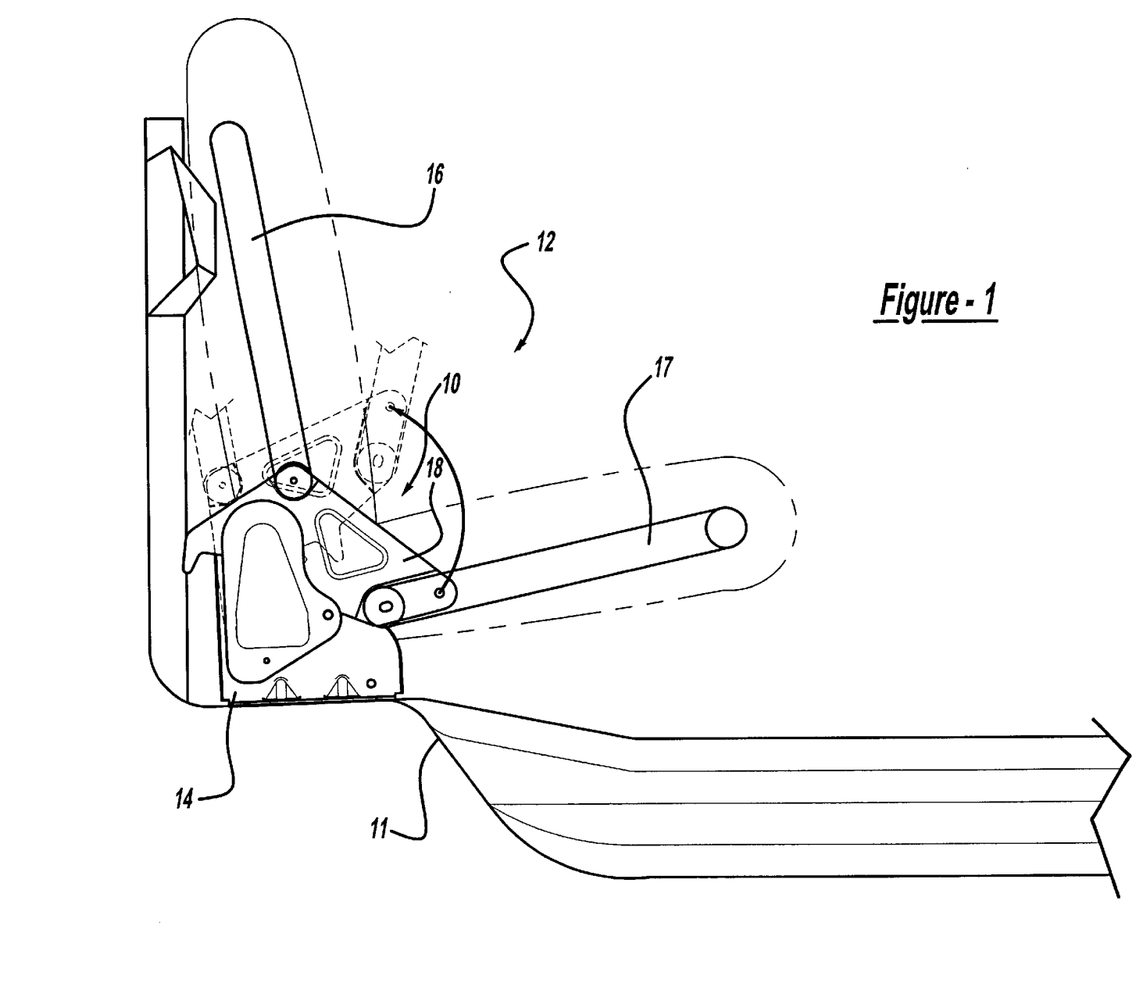
FIG. 1 is a side elevational view of a vehicle seat having an inertia-sensitive hinge mechanism in accordance with a preferred embodiment of the present invention with the seat shown with solid lines in a "deployed" position and in shadow in a "stowed" position.

An inertia-sensitive hinge mechanism 10 is shown in the attached Figures for use in a deployable seat assembly 12 having a seatback 16 and a seat bottom 17. The inertia-sensitive hinge mechanism 10 includes a lower hinge member 14 that can be attached to a floor 11 or floor pan of a motor vehicle and an upper hinge member 18 that, as described hereinafter, can be attached to the deployable seat 12 such as coupled to the seatback 16 and seat bottom 17. In general, the hinge mechanism 10 is adapted to permit the seatback 16 and seat bottom 17 of the deployable seat assembly 12 to be moved between a "stowed" position wherein the seatback 16 and seat bottom 17 are disposed in an upright orientation adjacent the interior walls of the vehicle cab (as shown in phantom in FIG. 1) and a "deployed" position wherein the seat bottom 17 is generally horizontal relative to the vehicle floor 11 and the seatback 16 is reclined slightly from the upright position (as shown in solid in FIG. 1). To accommodate the specific application described above, the upper hinge member 18 includes first coupling apertures 20 (FIG. 2) for connecting the seat bottom 17 in a fixed position relative thereto, such as through the use of appropriate bolts or pins. The upper hinge member 18 also includes a second coupling aperture 22 for connection to a lower portion of the seatback 16. The upper hinge member 18 rotates with respect to the lower hinge member 14 about a pivot 24.

In the illustrated embodiment, the lower hinge member 14 is fixed via rivet 35 to a mounting plate 26 having mounts 28 for coupling the mounting plate 26, and thereby the lower hinge member 14, to the vehicle floor 11 or floor pan in the manner discussed above. The lower and upper hinge members 14, 18, as well as the mounting plate 26, can be singular structural plates operably coupled to one another in the manner described below or can be fabricated by attaching a pair of flanged brackets or plates using rivets, welding, etc., whereby the plates define a space therebetween to accommodate additional components in an area free of foreign particles as generally known in the art. As shown, cover plates 84, 86 enclose the inertia-sensitive hinge mechanism 10 via attachment to the lower hinge member 14 and mounting plate 26, respectively.

The hinge mechanism 10 further includes an inertia sensing lockout assembly 29 for preventing rotation of the upper hinge member 18 from its stowed position relative to the lower hinge member 14 when predetermined deceleration forces are present. The inertia sensing lockout assembly 29 includes a guide assembly 30 operably coupled to each of the lower and upper hinge members 14, 18 to guide rotation of the upper hinge member 18 with respect to the lower hinge member 14 as well as an inertial actuator 32 pivotably coupled to the lower hinge member 14 by an actuator pivot 34 for movement between a blocking position (illustrated in FIG. 3) and a retracted position (illustrated in FIG. 2). The inertial actuator 32 is responsive to deceleration fores of a predetermined magnitude and operates to preclude movement of the upper hinge member 18 from its stowed position to its deployed position when the predetermined deceleration forces are present.

Figure 2:
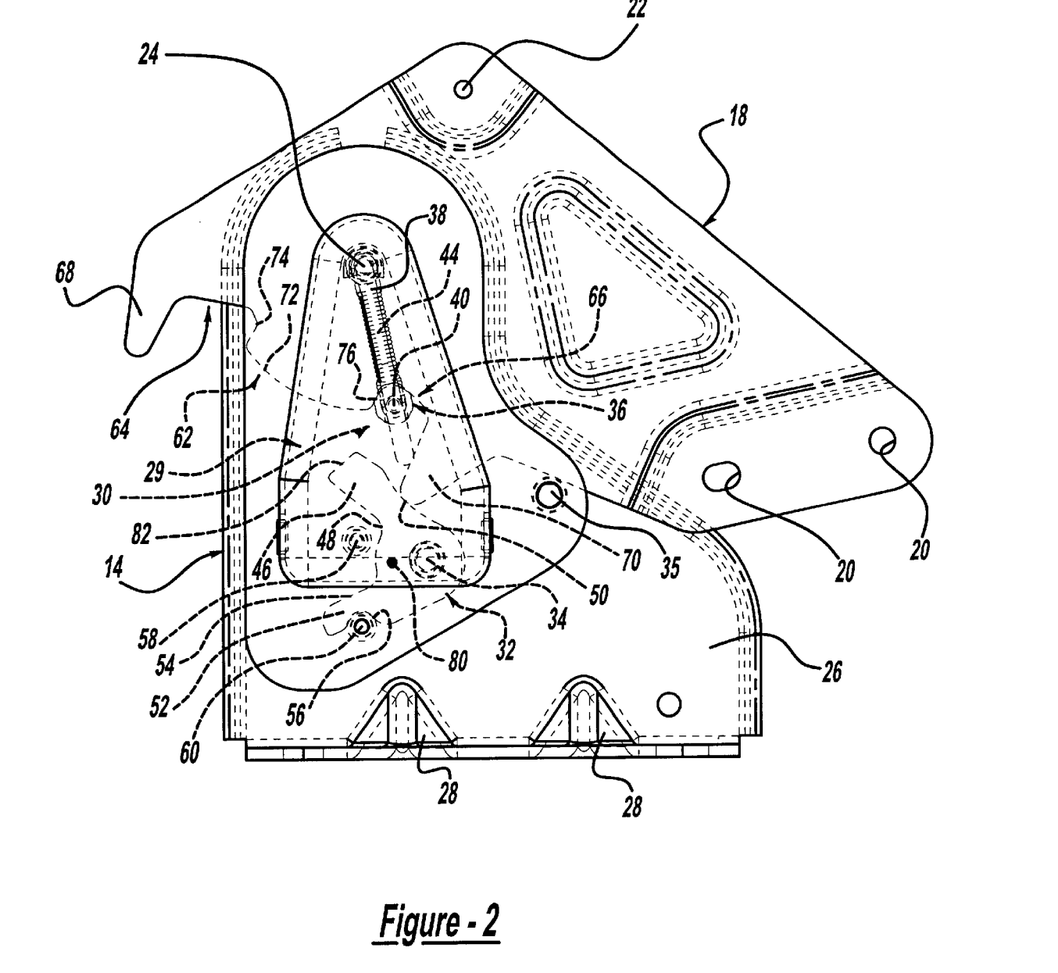
FIG. 2 is an elevational view of the inertia-sensitive hinge mechanism shown in FIG. 1 with an upper hinge member rotated to a "deployed" position and an inertial actuator maintained in a retracted position.

The guide assembly 30 includes a sliding pin 36 having flats 38 flanking a follower 42 and opposite ends 40 coupling the sliding pin 36 to the pivot 24 by a pair of extension springs 44. The sliding pin 36 is slidably mounted within opposing slots 80, 82 in lower hinge member 14 and mounting plate 26, respectively, for linear movement relative thereto. The slots 80, 82 allow axial movement of the follower 42 between a detent position illustrated in FIGS. 2 and 5 and a cam position illustrated in FIGS. 3 and 4 in the axial direction established by the pin 36. Lower ends of the extension springs 44 are connected to the opposite ends 40 of the sliding pin 36 to urge the follower 42 axially toward its detent position, as illustrated in FIGS. 2 and 5. Upper ends of the extension springs are coupled to the pivot 24.

The inertial actuator 32 includes a blocking leg 46 having inner and outer cams surfaces 48, 50 that are engageable by first and second positioning legs 68, 70 of the upper hinge member 18 to urge the actuator 32 into its blocking and retracted positions as hereinafter described. The blocking leg 46 further includes a blocking face 82 on an end of the blocking leg 46 between the inner and outer cam surfaces 48, 50. The blocking face 82 selectively engages the follower 42 to block rotation of the hinge member 18 when predetermined deceleration forces are present. The inertial actuator 32 also includes a stop leg 52 having inner and outer stop surfaces 54, 56, respectively, that engage first and second stop pins 58, 60 to define the blocking and retracted positions of the inertial actuator 32. It should be appreciated that first and second stop pins 58 and 60 are fixed between the lower hinge member 14 and the mounting plate 26 and, in the preferred embodiment, are rivets that pass through the lower hinge member 14 and the mounting plate 26.

The upper hinge member 18 includes a guide tab 62 bounded on respective sides by a first recess 64 and a second recess 66 and the first and second positioning legs 68, 70 on the other side of the respective recesses. The guide tab 62 includes first and second detents 74, 76 and a projecting cam surface 72 that extends therebetween.

Figure 3:
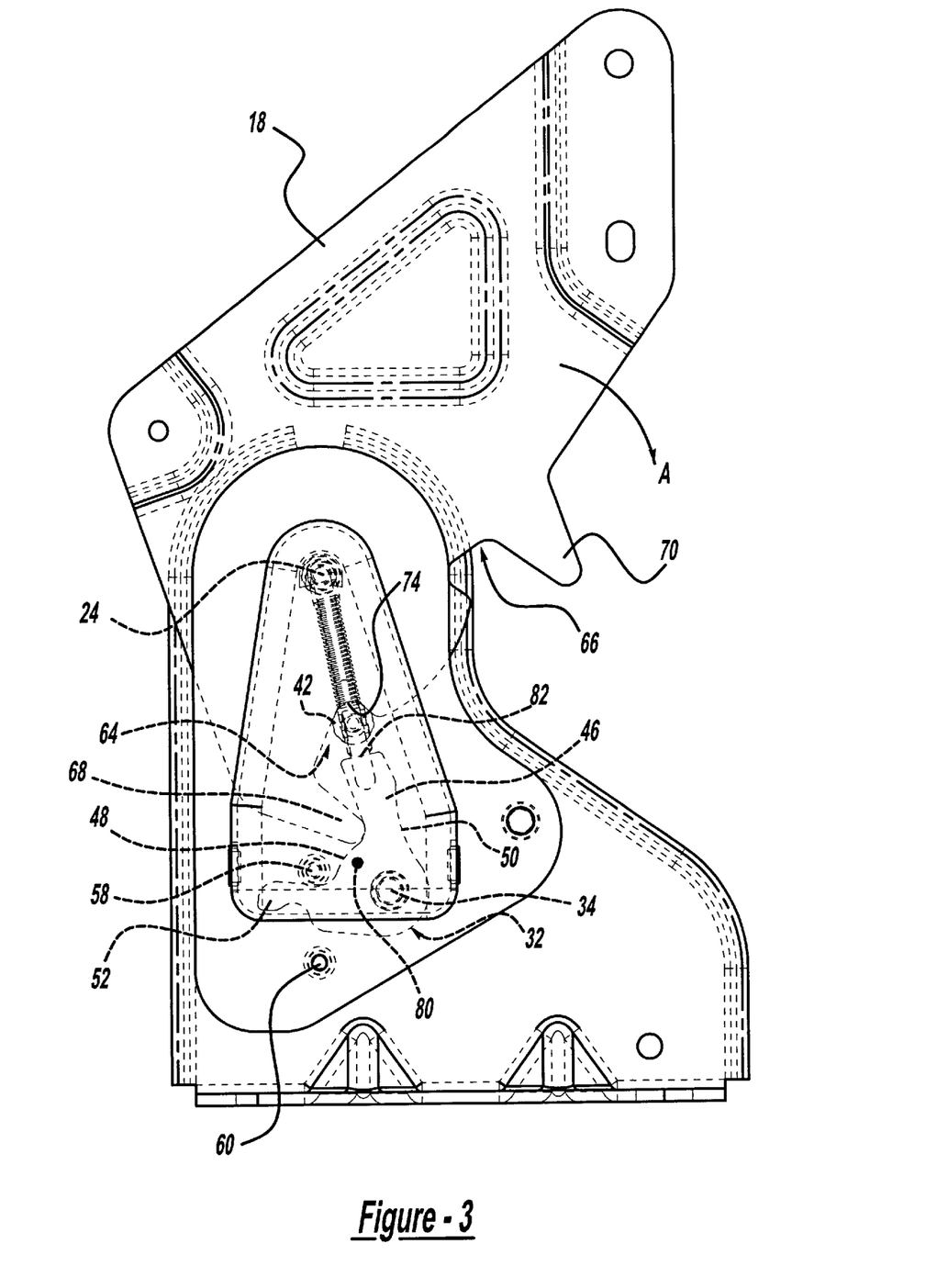
FIG. 3 is an elevational view of the inertia-sensitive hinge mechanism shown in FIG. 1 with the upper hinge member in a "stowed" position and the inertial actuater in its blocking position.
Figure 4:
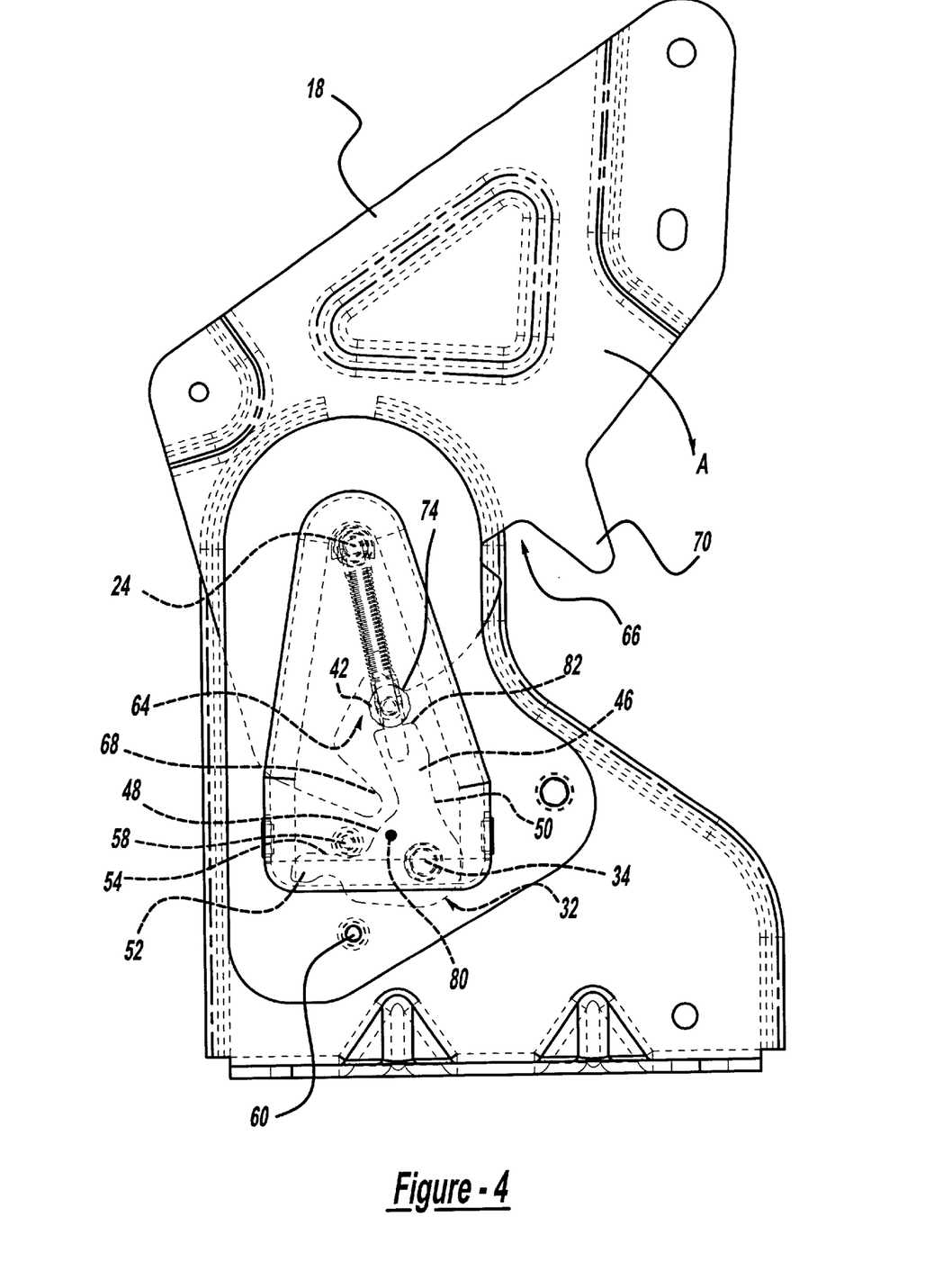
FIG. 4 is an elevational view of the inertia-sensitive hinge mechanism shown in FIG. 1 with the inertia sensing lockout assembly preventing rotation of the upper hinge member from its stowed position when deceleration forces exceeding a predetermined threshold level are present.
Figure 5:
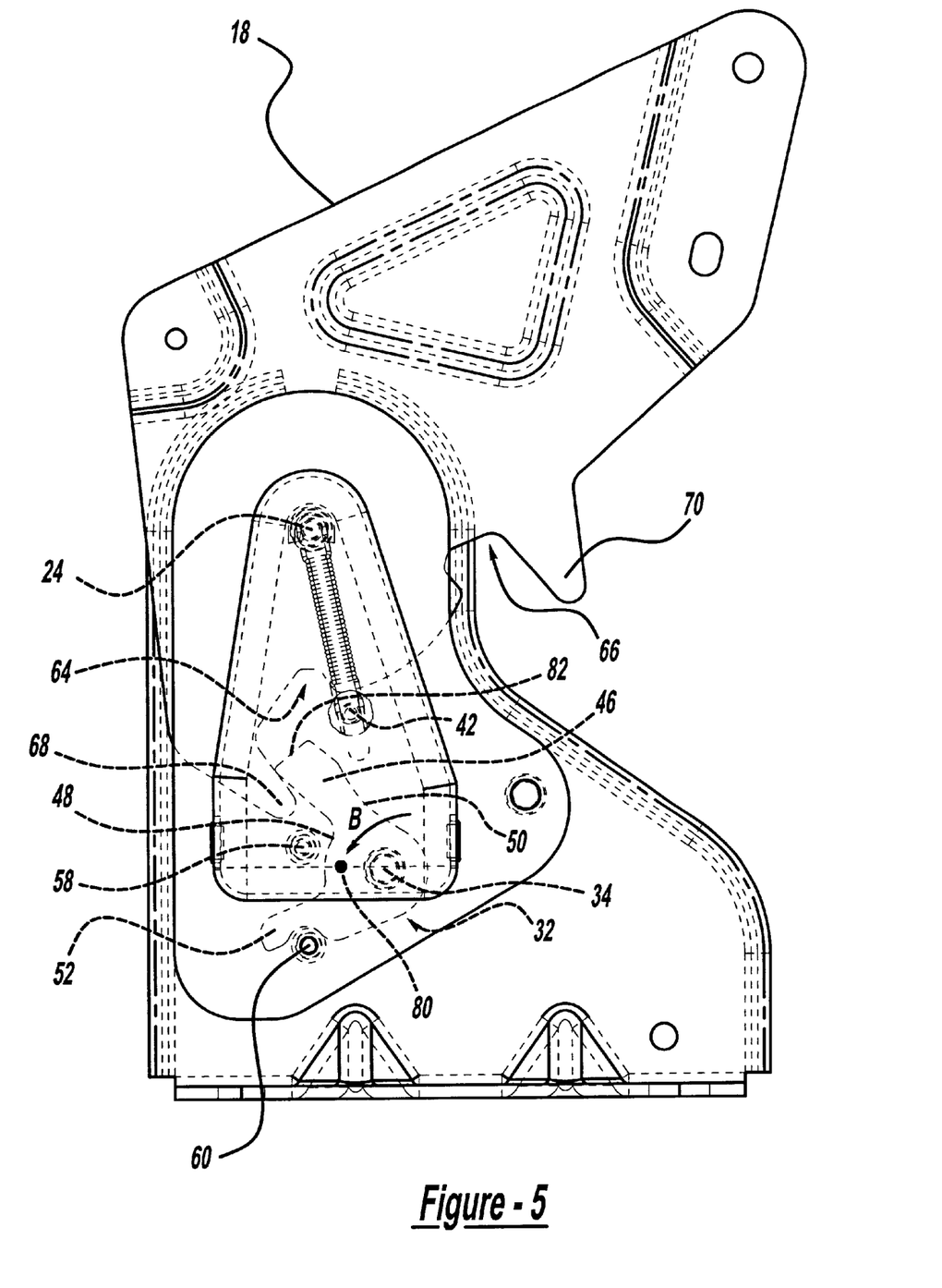
FIG. 5 is an elevational view of the inertia-sensitive hinge mechanism shown in FIG. 1 with the upper hinge member between a "stowed" position and a "deployed" position and an inertial actuator maintained in a retracted position.
Figure 6:
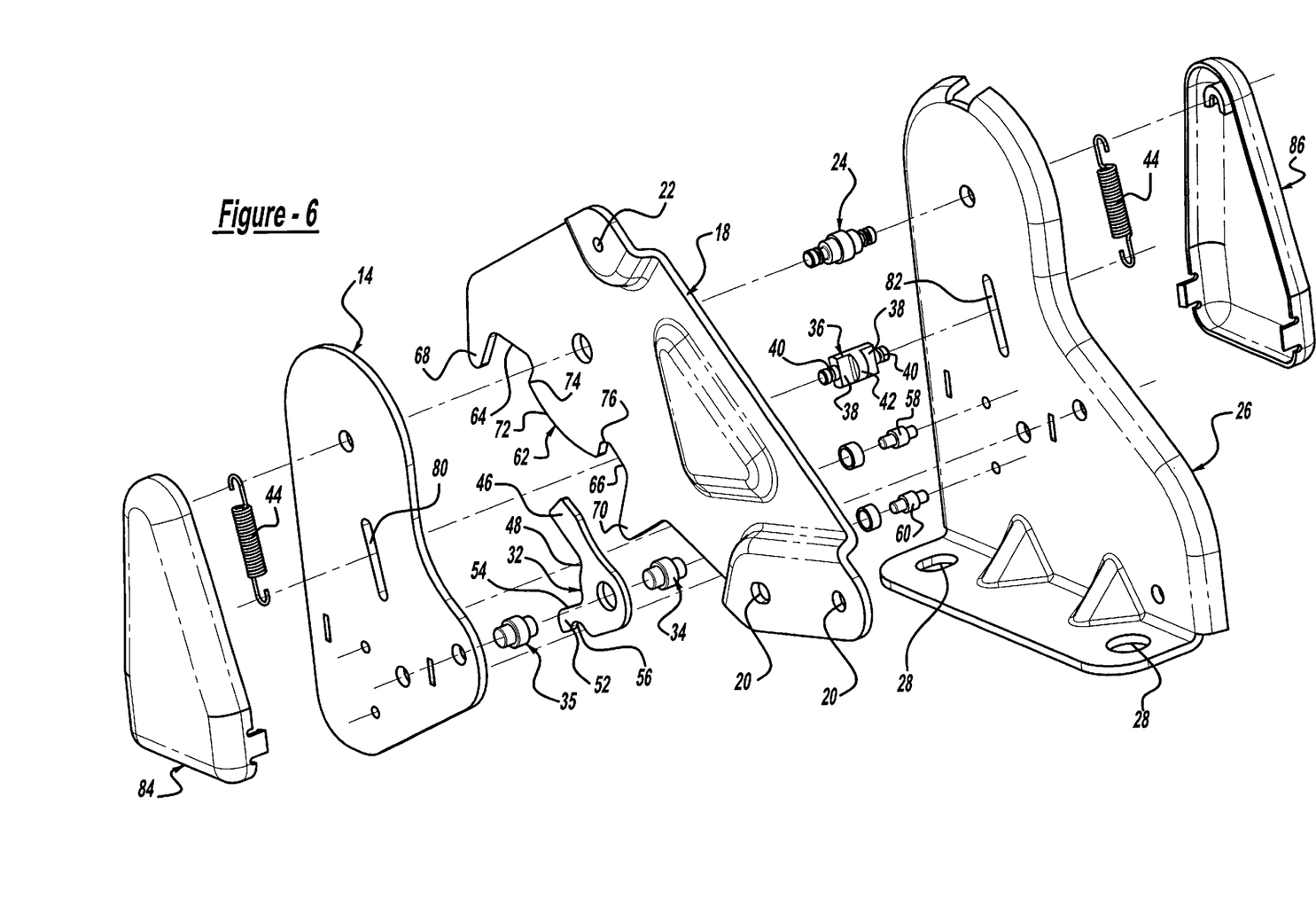
FIG. 6 is an exploded view of the inertia-sensitive hinge mechanism shown in FIG. 1.

The hinge mechanism 10 is shown in FIGS. 3 and 4 in its stowed position wherein the follower 42 is disposed within the first recess 64 and against the first detent 74 and the inertial actuator 32 is in its blocking position such that the inner stop surface 54 engages first stop pin 58 and the blocking leg 46 engages the follower 42 to block rotation of the hinge member. When deceleration forces exceeding a predetermined level are not present and an operator rotates the seat assembly 12 from the stowed position toward the deployed position (in a direction indicated by arrow "A" in FIG. 4), the upper hinge member 18 rotates about the pivot 24. During the initial rotation, the follower 42 is moved along the first detent 74 from its detent position illustrated in FIG. 3 toward its camming position illustrated in FIG. 5. Simultaneous with the movement of the follower 42, the first positioning leg 68 of upper hinge member 18 is rotated away from the inner cam 48 of the inertial actuator 32, thereby allowing the inertial actuator 32 to rotate toward its retracted position. More particularly, the center of gravity of inertial actuator 32, generally represented by reference numeral 80, is located upwardly and horizontally rearward of the actuator's center of rotation (i.e., actuator pivot 34) when the inertial actuator 32 is in its blocking position (FIGS. 3 and 4). As a result, the inertial actuator 32 rotates (in the direction of arrow "B" in FIG. 5) under the force of gravity upon displacement of the first positioning leg 68.

A sufficient force must be provided during the initial movement of upper hinge member 18 in the direction of arrow "A" (FIGS. 3 and 4) to displace the follower 42 axially against the bias of the extension springs 44 to allow the follower 42 to ride along the cam surface 72 as shown in FIG. 5. In the preferred embodiment, the force exerted by the extension springs 44 over the axial distance between the detent position (FIG. 3) and the cam position (FIG. 5) of the follower 42 is such that a force of approximately 30 to 50 pounds is required to displace the follower 42 from its detent position to its cam position. Those skilled in the art will appreciate that the magnitude of the required force may be varied depending on the specific application for the hinge mechanism 10.

Continued rotation of upper hinge member 18 toward its deployed position shown in FIG. 2 causes the follower 42 to move along the cam surface 72 (as illustrated in FIG. 5) until the follower 42 rotates into the second recess 66. In this position, the follower 42 is moved into its detent position under the urging of the extension springs 44. Similarly, as the upper hinge member 18 approaches its deployed position, the second positioning leg 70 contacts the outer cam 50 of the blocking leg 46 and further urges the inertial actuator 32 toward its retracted position.

As explained above, the extension springs 44 bias the follower 42 in a retracted direction toward the pivot 24. As a result, when the follower 42 is in the first or second recess 64, 66 flanking the tab 62; i.e., engaging the first detent 74 or the second detent 76, the ex tension springs 44 eliminate any undesirable vibration commonly referred to as chucking. More specifically, the extension springs 44 act upon the upper hinge member 18 through the follower 42 to secure the upper hinge member 18 against vibration. The upper hinge member 18 in turn secures the inertial actuator 32 against the first stop pin 58 or the second stop pin 60 to prevent actuator rattling when the upper hinge member 18 is in either its stowed or deployed positions. The biased engagement of the follower 42 with the first and second detents 74, 76, respectively, allows the operator to feel the follower 42 seat in the first and second detents 74, 76 when the upper hinge member 18 reaches its fully deployed or stowed positions.

When deceleration forces exceeding a predetermined level are present and the upper hinge member 18 is in its stowed position, as shown in FIG. 4, the upper hinge member 18 initially rotates slightly (in the direction of arrow "A") from the stowed position toward the deployed position. In the absence of the predetermined deceleration forces, the inertial actuator 32 would rotate about the pivot 34 in a counterclockwise direction as the force of gravity acted on the actuator's center of gravity as described above and the hinge mechanism 18 would move toward its deployed position. Because the center of gravity 80 of actuator 32 is spaced radially from the center of rotation, however, the deceleration forces generate a torque load on the inertial actuator 32 in a clockwise direction about the pivot 34 that is greater than the gravitational forces tending to rotate the actuator in a counterclockwise direction. Thus, the blocking leg 46 of the inertial actuator 32 remains in its blocking position because a predetermined level of deceleration forces hold the inertial actuator 32 against the first stop pin 58. When the upper hinge member 18 rotates slightly away from its stowed position, as shown in shadow in FIG. 4, the follower 42 is axially displaced along the sliding pin 36 until the follower 42 engages the blocking face 82 on the distal end of the blocking leg 46, thereby holding the follower 42 in its first position substantially within the detent 74 and the hinge mechanism 10 in its stowed position.

As generally noted above, the center of gravity of inertial actuator 32 is radially positioned spaced apart from the actuator pivot 34 as indicated by reference numeral 80. In the preferred embodiment of the present invention, inertial actuator 32 is configured such that its center of gravity is positioned upwardly and horizontally rearward of the actuator's center of rotation (i.e., actuator pivot 34) when the inertial actuator 32 is in its blocking position as shown in FIGS. 3 and 4. The exact position of the center of gravity will change depending on the particular seat design, or if used for a center console or armrest hinge application. Further, the preferred location of the center of gravity can be modified in relation to the "predetermined deceleration forces" necessary to move the inertial actuator 32 to its blocking position.

In sum, the hinge mechanism 10 is normally positioned as shown in FIG. 3 with the upper hinge member 18 of the hinge mechanism 10 in the stowed position. If the occupant desires to use the stowable seat, the upper hinge member 18 is pivoted toward the deployed position shown in FIG. 2. The seat assembly 12 can be returned to the stowed position by simply moving the upper hinge member 18 into the stowed position. When the seat is in the stowed position and the vehicle experiences deceleration forces above the predetermined threshold level, however, the inertial actuator 32 blocks the follower 42 to prevent rotation of the upper hinge member 18. Thus, unexpected movement of the seat assembly 12 from the stowed to deployed position is prevented.

The inertia sensitive hinge mechanism 10 is a relatively simple and effective assembly that favors reliable, long-term operation corresponding to decreased costs associated with manufacture, materials, and repair, as well as long-term customer satisfaction. Further, the inertial actuator 32 is rotated between two positions whenever the hinge mechanism is moved between the deployed and stowed positions, regardless of whether deceleration forces are present, which prevents the inertial actuator 32 from freezing or corroding in place.

While the above description constitutes the preferred embodiment of the present invention, it is to be understood that the invention is readily susceptible to modification, variation and change without departing from the proper scope and fair meaning of the accompanying claims. Other features and advantages of the present invention will be readily apparent to those skilled in the art.

What is claimed is:

1. A seat comprising:

a seatback;

a seat bottom;

an inertia sensitive hinge mechanism having a first hinge member coupled to a second hinge member for rotation about a pivot between a first position and a second position, said seatback and said seat bottom coupled to said first hinge member, said inertia sensitive hinge mechanism further including:
a guide assembly coupled to said first and second hinge members and including a tab fixed for movement with one of said first and second hinge members, said tab having a first detent and a cam surface, said guide assembly further including a follower movable between a detent position and a cam position, said follower being in said detent position and engaging said first detent when said first member is in said first position, said follower being in said cam position when said first member is between said first and second positions;
an inertial actuator operatively connected to and rotatable with respect to the other of said first and second hinge members between a blocking position and a retracted position, said inertial actuator including a center of rotation and a center of gravity spaced from said center of rotation; and
wherein, when said first hinge member is in said first position and a predetermined deceleration force is present, said predetermined deceleration force places said inertial actuator in said blocking position to operatively engage said follower and prevent said follower from moving from said detent position to said cam position.

2. The seat of claim 1 wherein said seatback is coupled to said inertia sensitive hinge mechanism for rotation relative thereto.

3. The seat of claim 1 wherein said guide assembly further includes a pin, said pin mounting said follower for axial movement between said cam position and said detent position, and wherein said guide assembly further includes a spring biasing said follower toward said detent position.

4. The seat of claim 3 wherein said tab is formed by said first hinge member and said pin is coupled to said second hinge member, and said follower and tab cooperate to guide rotation of said first hinge member with respect to said second hinge member.

5. The seat of claim 4 wherein said first hinge member includes first and second positioning legs, said inertial actuator includes first and second cam surfaces, said tab is located between said first and second positioning legs, said first hinge member includes a first recess and a second recess, said first recess is located between said first positioning leg and said tab, said second recess is located between said second positioning leg and said tab, wherein said follower is disposed in said first recess in contacting engagement with said tab and said first positioning leg engages said first cam surface to move said inertial actuator into said blocking position when said first hinge member is moved into said first position, and wherein said follower is disposed in said second recess in contacting engagement with said tab and said second positioning leg engages said second cam surface to move said inertial actuator into said retracted position when said first hinge member is moved into said second position.

6. The seat of claim 1 wherein said second hinge member is adapted to be coupled to a vehicle floor.

7. The seat of claim 1 wherein said center of gravity is located above and horizontally offset from said center of rotation such that said inertial actuator is normally adapted to rotate in a first direction when the predetermined deceleration force is present and in a second direction when the predetermined deceleration force is absent.

8. The seat of claim 1 wherein said tab includes a second detent and said cam surface extends between said first and second detents, and wherein said follower is in said detent position engaging said second detent when said first member is in said second position.

9. An inertia sensitive hinge mechanism for use in a seat assembly including a seat bottom and a seat back, said hinge mechanism comprising:
a first hinge member adapted for attachment to the seat back;
a second hinge member adapted for attachment to the seat bottom, said first hinge member coupled to said second hinge member for rotation about a pivot between a first position and a second position;
a guide assembly coupled to said first and second hinge members and including a tab fixed for movement with one of said first and second hinge members, said tab having a first detent and a cam surface, said guide assembly further including a follower movable between a detent position and a cam position, said follower being in said detent position and engaging said first detent when said first hinge member is in said first position, said follower being in said cam position when said first hinge member is between said first and second positions;
an inertial actuator operatively connected to and rotatable with respect to the other of said first and second hinge members between a blocking position and a retracted position, said inertial actuator including a center of rotation and a center of gravity spaced from said center of rotation; and
wherein, when said first hinge member is in said first position and a predetermined deceleration force is present, said predetermined deceleration force places said inertial actuator in said blocking position to operatively engage said follower and prevent said follower from moving from said detent position to said cam position.

10. The inertia sensing lockout assembly of claim 9 wherein said guide assembly further includes a spring biasing said follower toward said detent position.

11. The inertia sensing lockout assembly of claim 10 wherein said guide assembly further includes a pin, said pin mounting said follower for axial movement between said cam position and said detent position.

12. The inertia sensing lockout assembly of claim 11 wherein said tab is formed by said first hinge member, said pin is coupled to said second hinge member, and said follower and tab cooperate to guide rotation of said first hinge member relative to said second hinge member.

13. The inertia sensitive hinge mechanism of claim 9 further including actuator stop means fixed to the other of said first and second hinge members for limiting rotation of said inertial actuator, said inertial actuator engaging said actuator stop means when said inertial actuator is in said blocking and retracted positions.

14. The inertia sensitive hinge mechanism of claim 13 wherein said actuator stop means includes first and second stop,pins fixed to the other of said first and second hinge members, said inertial actuator engaging said first stop pin when said inertial actuator is in said blocking position and said second stop pin when said inertial actuator is in said retracted position.

15. The inertia sensitive hinge mechanism of claim 14 wherein said inertial actuator includes a stop leg having a first stop surface and a second stop surface, said first stop surface engaging said first stop pin when said inertial actuator is in said blocking position, said second stop surface engaging said second stop pin when said inertial actuator is in said retracted position.

16. The inertia sensitive hinge mechanism of claim 15 wherein said one of said first and second hinge members includes first and second-positioning legs and said inertial actuator includes first and second cam surfaces, said first positioning leg engaging said first cam surface to move said inertial actuator into said blocking position when said first hinge member is moved into said first position, said second positioning leg engaging said second cam surface to move said inertial actuator into said retracted position when said first hinge member is moved into said second position.

17. The inertia sensitive hinge mechanism of claim 16 wherein said tab is between said first and second positioning legs and said first hinge member includes first and second recesses, said first recess located between said first positioning leg and said tab, said second recess located between said second positioning leg and said tab.

18. The inertia sensitive hinge mechanism of claim 17 wherein said follower is disposed in said first recess in contacting engagement with said tab when said first hinge member is in said first position and wherein said follower is disposed in said second recess in contacting engagement with said tab when said first hinge member is in said second position.

19. The inertia sensitive hinge mechanism of claim 9 wherein said inertia sensitive hinge mechanism is incorporated into a vehicle seat hinge mechanism.

20. The inertia sensitive hinge mechanism of claim 19, wherein said first hinge member includes a first aperture for coupling said first hinge member to a seat bottom and a second aperture for coupling said first hinge member to a seatback.

21. The inertia sensitive hinge mechanism of claim 9 wherein said inertia sensitive hinge mechanism is incorporated into an armrest hinge mechanism.

22. The inertia sensitive hinge mechanism of claim 9 wherein said tab includes a second detent and said cam surface extends between said first and second detents, and wherein said follower is in said detent position engaging said second detent when said first member is in said second position.

* * * * *